United States Patent [19]

Frank et al.

[11] 4,104,657
[45] Aug. 1, 1978

[54] PIEZOELECTRIC ELECTRONIC SHUTTER CONTROL FOR CAMERAS

[75] Inventors: Lee Fitzpatrick Frank; James Kelly Lee, both of Rochester, N.Y.

[73] Assignee: Eastman Kodak Company, Rochester, N.Y.

[21] Appl. No.: 816,834

[22] Filed: Jul. 18, 1977

[51] Int. Cl.² .......................... G03B 7/08; G03B 9/62
[52] U.S. Cl. ...................................... 354/50; 354/234
[58] Field of Search ............... 354/50, 60 R, 142, 234, 354/271, 135; 350/161 R, 269; 310/331, 332

[56] References Cited
U.S. PATENT DOCUMENTS 3,110,824  11/1963  Flanagan ..................... 354/271 X
3,598,030  8/1971  Beach ........................... 354/60 R Primary Examiner—L. T. Hix
Assistant Examiner—M. L. Gellner
Attorney, Agent, or Firm—Warren W. Kurz

[57] ABSTRACT

A shutter control device is disclosed which includes a shutter which is openable to permit scene light to pass through a camera aperture, an electronic circuit for producing a signal which varies in accordance with the level of scene illumination, and a single piezoelectric energy conversion device such as a bimorph for providing electrical energy to the circuit and for controlling the condition of the shutter in response to the signal from the electronic circuit to automatically establish the exposure period.

13 Claims, 5 Drawing Figures

PIEZOELECTRIC ELECTRONIC SHUTTER CONTROL FOR CAMERAS

CROSS-REFERENCE TO RELATED APPLICATION

Reference is made to commonly assigned, co-pending U.S. Patent application Ser. No. 816,776, entitled PIEZOELECTRIC CAMERA SHUTTER, filed in the names of L. F. Frank and J. K. Lee on July 18, 1977.

BACKGROUND OF THE INVENTION

1. Field of the Invention

The present invention relates to exposure control devices for use in still cameras and the like, and more particularly to a shutter control device for automatically establishing exposure time in accordance with the level of scene illumination.

2. Description of the Prior Art

In many prior art shutter control devices which include timing circuits for establishing shutter speed, the circuit is energized by a battery contained in the camera. Such mechanisms usually include an electromagnetic transducer adapted to close the shutter after a period of time determined by the timing circuit. Although such arrangements are generally satisfactory, they rely on the availability of sufficient power from the battery. When the battery power is inadequate for operation of such systems, either the shutter operates at a fixed, predetermined speed or it remains open indefinitely, depending on the type of shutter control.

Photographic apparatus such as cameras that employ electric generators for energizing exposure control circuits have been described in the patent literature, such as in U.S. Pat. No. 3,598,030. However, we do not know of any commercial use of such apparatus, which commonly are shown with a spring-driven member to rapidly rotate the generator armature. One possible disadvantage which may have discouraged the use of such generators might be a tendency to cause camera vibration and noise during armature run-down. Since the energy conversion of such generators is inefficient, a substantial amount of energy must be stored in the spring, and this is generally done during manual film advance or by preliminary shutter release button movement. The greater the amount of energy needed to power the generator, the more physical effort is demanded from the operator.

In commonly assigned, co-pending U.S. Pat. application Ser. No. 816,776, entitled PIEZOELECTRIC CAMERA SHUTTER, filed in the names of L. F. Frank and J. K. Lee on July 18, 1977, a shutter control device was disclosed which employed a piezoelectric bimorph for providing electrical energy for powering an electronic exposure control circuit and a second bimorph for converting an electric control signal from the circuit to mechanical energy to terminate exposure. The shutter control device disclosed in that application represented a significant improvement over previously known mechanisms because piezoelectric devices are more reliable than battery sources and more efficient than conventional, non-battery powered sources known in the prior art for powering camera exposure control system. In fact piezoelectric devices have very little resistive loss, and may operate at electro-mechanical conversion efficiencies as high as about 50%. As motors, piezoelectric devices are extremely fast acting and therefore permit very accurate timing while operating at low energy levels. They may be latched in a selected position without draining power and have a theoretically infinite operational life.

The present invention is an improvement over the mechanism shown in aforementioned U.S. Patent application Ser. No. 816,776, wherein the functions of the generator bimorph and the motor bimorph are performed by a single bimorph, thus effecting a savings in elements and associated manufacturing costs.

SUMMARY OF THE INVENTION

In accordance with the present invention, there is provided an openable shutter, the speed of which is controlled by an electronic circuit which produces a signal having a characteristic which is a function of scene illumination. Electrical energy for powering the electronic circuit and mechanical energy for terminating exposure is derived from a single, high efficient, fast acting and accurate piezoelectric electro-mechanical energy conversion device such as a bimorph.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

Piezoelectricity is a well known phenomenon exhibited by certain crystals. In brief, when such crystals are compressed or extended in particular directions, electric charges of opposite signs are produced at opposite ends of the crystal. Not only is an electric moment induced in piezoelectric crystals by an application of mechanical stress or strain, there is also a converse effect; namely, on applying an electric field, the crystal changes shape by expansion in one direction and contraction in another. A fuller discussion of the direct and converse effects may be found in ENCYCLOPAEDIC DIRECTORY OF PHYSICS, Pergamon Press, 1962, pages 503–505.

A bimoprh, or bimorph cell, is a member composed of two strips of piezoelectric material joined together (such as by cement) with the direction of expansion of one strip aligned with the direction of contraction of the other such that the application of an electric potential to both strips causes one to expand and the other to contract, thus producing a bending of the combination in a manner analogous to the curling of a bimetallic strip due to differential expansions when heat is applied. Until the potential difference is removed, the bimorph will remain bent. If a bimorph is physically bent, an electric potential difference tending to return the bimorph to its original configuration will develop from one strip to the other strip. That potential difference will remain until either the potential is externally removed or the bimorph is unflexed. If the bimorph is bent and the originally created potential difference dissipated, such as by shorting or through a load, the unbending of the bimorph by external force or its own internal spring force will produce an electric potential of a polarity opposite to that of the original potential produced when the bimorph was first bent. This potential will resist the forces (e.g., internal spring force) tending to return the bimorph to its original configuration.

The drawings illustrate the operating principal of a camera incorporating a preferred embodiment of the present invention. Because cameras are well known, the present description will be directed in particular to elements forming part of, or cooperating more directly with, the present invention. Camera elements not specifically shown or described may take various forms well known to those skilled in the art.

Figure 1:
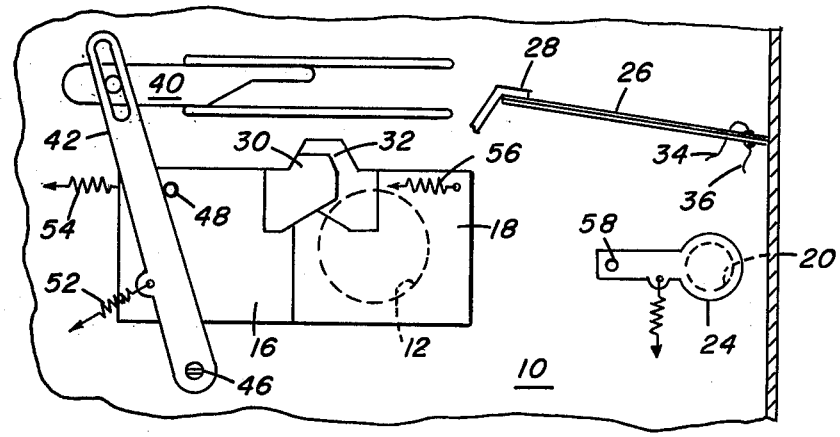
FIGS. 1–4 are schematic representations of a portion of a camera in accordance with a preferred embodiment of the present invention in various stages of operation.
Figure 5:
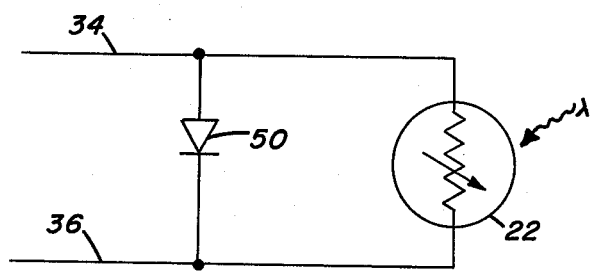
FIG. 5 is a schematic electrical diagram of electronics in accordance with a preferred embodiment of the present invention.

Referring to the drawings, and specifically to FIG. 1, a camera housing 10 has an aperture 12 for focusing an image to be photographed at the camera's film plane, not shown. Between the aperture and the film plane, a pair of shutter blades 16 and 18 are spring-urged to the left as shown. A second aperture 20 in housing 10 is aligned with a photoresponsive element 22 (FIG. 5) of exposure control electronics. Light, passing through aperture 20, is normally blocked from the photoresponsive element by a mask 24, but the mask may be manually pivoted to an inactive position by the operator to initiate exposure as will be explained hereinafter.

A bimorp strip 26 is fixed at one of its ends to housing 10 in cantilever fashion and carries a latch member 28 at the other end for cooperation with a pair of tabs 30 and 32 on shutter blades 16 and 18, respectively. Electrical leads 34 and 36 interconnect the respective plates of bimorph 26 and the electronics package of FIG. 5.

A reset mechanism for adjusting the shutter blades and the bimorph strip to a condition preparatory to taking a picture includes a slide cam 40 pivotally and slidably connected to a lever 42 which is itself rigidly connected to a manually operable crank, not shown, and pivotally mounted on housing 10 at shaft 46.

FIGS. 1-4 are schematic views of certain elements of the camera showing the elements in various stages of a complete cocking and exposure cycle. In FIG. 1, the camera elements are shown in their "run down" conditions wherein shutter blades 16 and 18 are in their leftmost positions and closing blade 18 covers aperture 12 and mask 24 covers aperture 20. Bimorph 26 is relaxed and unstressed and there is no voltage across the bimorph on leads 34 and 36.

Figure 2:
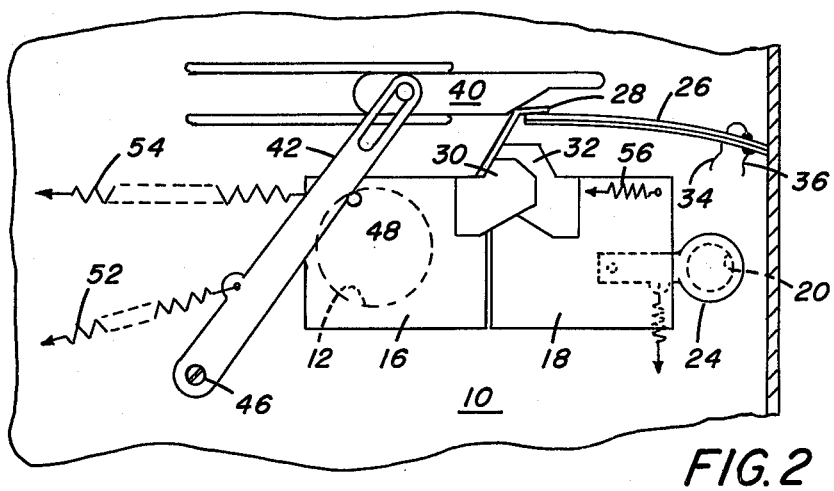

In preparation for making an exposure, the operator manually rotates lever 42 in a clockwise direction (FIG. 1). Lever 42 engages a stud 48 on opening shutter blade 16 to move blade 16 and blade 18 to the right to their positions shown in FIG. 2. Lever 42 also moves slie cam 40 to the right. The cam surface engages latch member 28 to bend bimorph 26 until latch member 28 engages the top of blade 16, also as shown in FIG. 2.

Such flexing of bimorph 26 will, of course, generate a potential thereacross. However, leads 34 and 36 conduct that potential to the electronics package shown in FIG. 5 whereat a diode 50 is arranged across bimorph 26 to be forward biased by such a voltage and the potential is shorted through the diode.

When lever 42 is released, a spring 52 returns the lever and slide cam 40 to their FIG. 1. positions. The force of springs 54 and 56 on the shutter blades, and the spring action of bimorph 26 itself, will cause the bimorph to begin to unbend. The unbending motion of the bimorph generates a voltage which is of a sign which reverse biases diode 50. Therefore, the voltage remains across the bimorph and acts to resist further unbending movement.

A point of equilibrium is reached where the spring forces tending to unbend the bimorph are just offset by the electromotive force resisting the unbending movement. At that point, shown in FIG. 3, latch member 28 still retains tabs 30 and 32 to keep shutter blades 16 and 18 from running down.

Figure 4:
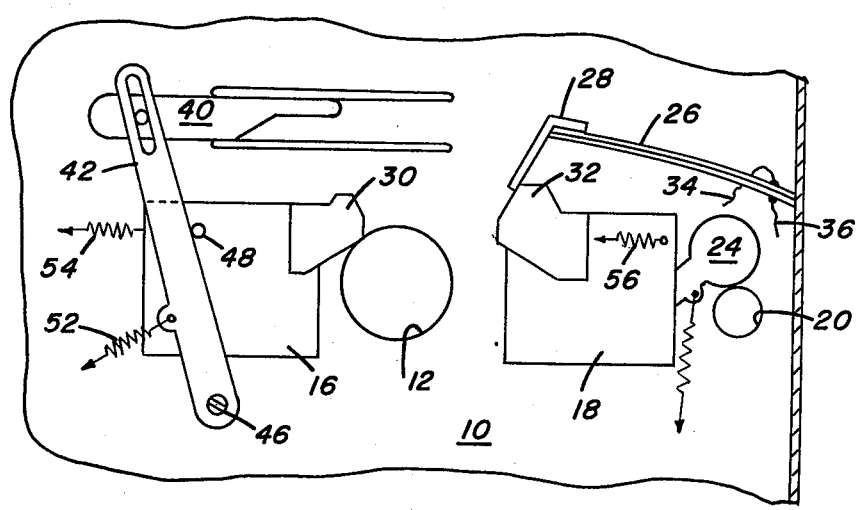

In order to effect an exposure, the operator manually pivots mask 24 about its stud 58 to allow scene light to reach photoresponsive element 22. Element 22 will conduct electricity as a function of the amount of light striking it so as to create a variable current signal. A short time after the mask is moved out of alignment with aperture 28, sufficient charge has leaked from bimorph 26 through element 22 to allow bimorph 26 to unbend to an extent that latch member 28 releases tab 30 to begin exposure as shown in FIG. 4. As the charge continues to leak through element 22 at a rate determined by the amount of light falling thereon, latch member 28 continues to move upwardly until tab 32 is also free, spring 56 moves blade 18 to the left as shown in FIG. 1, and exposure is terminated. The duration of exposure is, of course, inversely proportional to the rate of leakage through photoresponsive element 22 as determined by the intensity of light impinging upon the element, which might for example be a CdS cell.

Figure 3:
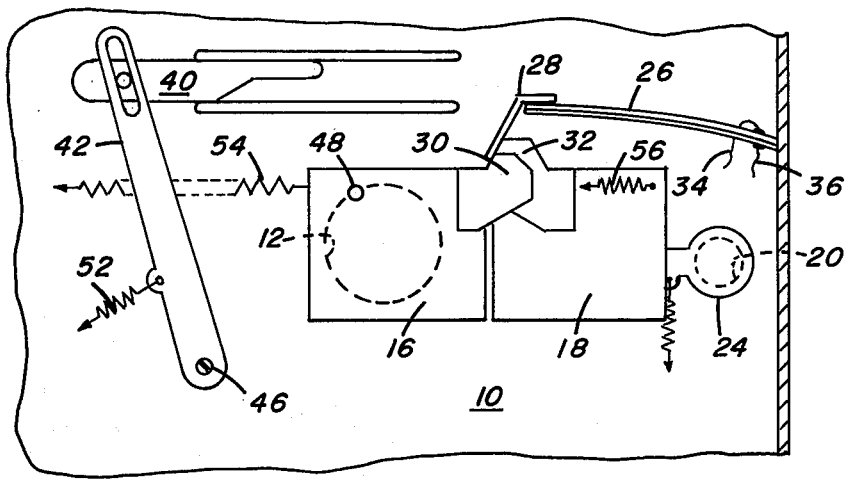

As depicted, the shutter blades are held in their cocked, FIG. 3, position by a balance of spring and electromotive forces. While bimorphs may be latched in selected positions without draining power, and will remain in such positions as long as the voltage thereacross is constant, one might want to provide means to prevent latch member 28 from being jarred from tab 30. Several mechanisms for accomplishing this function will readily occur to those skilled in the art, such as for example lever 42 might be latched in its FIG. 2 position with slide cam 40 over latch member 28 until exposure is desired. Or, one might choose to hold only the closing blade with the bimorph, while holding the opening blade with a conventional latch less likely to be jarred loose than a bimorph latch.

The invention has been described in detail with particular reference to a preferred embodiment thereof, but it will be understood that variations and modifications can be effected within the spirit and scope of the invention.

We claim:

1. A camera of the type having (1) an exposure aperture and (2) a shutter movable to open and close the aperture; said camera comprising:
   a piezoelectric energy conversion device having an original shape;
   releasable means for deforming said piezoelectric device from its original shape in a first direction to create a first electric charge tending to return said device to its original shape;
   means for dissipating said first electric charge from said piezoelectric device, whereby a second electric charge tending to resist the return of said device to its original shape is created when said deforming means is released;
   means for dissipating said second electric charge at a rate which is a function of the level of scene illumination; and
   means, responsive to said second charge having dissipated to a predetermined level, for controlling movement of the shutter from its open to its closed position.

2. The invention as defined in claim 1 wherein said piezoelectric device is a bimorph.

3. The invention as defined in claim 1 wherein:
said piezoelectric device is a bimorph; and
said deforming means is adapted to bend said bimorph.

4. The invention as defined in claim 1 wherein said means for dissipating said first charge is a diode effectively across said piezoelectric device and adapted to be forward biased by said first charge and reverse biased by said second charge.

5. The invention as defined in claim 1 wherein said means for dissipating said second charge is a photoconductive element across said piezoelectric device.

6. The invention as defined in claim 1 wherein said shutter control means comprises:
shutter closing means for urging the shutter toward its closed position; and
means for disabling said shutter closing means until said second charge has dissipated to said predetermined level.

7. The invention as defined in claim 6 wherein:
said shutter closing means comprises spring means for ugring the shutter to its closed position; and
said disabling means comprises (1) latch means for holding the shutter open and (2) means, operated by said piezoelectric device, for opening said latch means.

8. The invention as defined in claim 1 wherein said deforming means and said first electric charge dissipating means are adapted to operate substantially simultaneously.

9. A camera of the type having (1) an exposure aperture and (2) a shutter movable to open and close the aperture; said camera comprising:
a piezoelectric energy conversion device having an original shape;
means for deforming said piezoelectric device from its original shape in a first direction to create a first electric charge tending to return said device to its original shape;
means for dissipating said first electric charge from said piezoelectric device;
means for dissipating, at a rate which is a function of the level of scene illumination, a second electric charge created over said piezoelectric device as said device returns to its original shape; and
means, responsive to said second charge having dissipated to a predetermined level, for controlling movement of the shutter from its open to its closed position.

10. The invention as defined in claim 9 wherein said piezoelectric device is a bimorph.

11. The invention as defined in claim 9 wherein:
said piezoelectric device is a bimorph; and
said deforming means is adapted to bend said bimorph.

12. The invention as defined in claim 9 wherein said means for dissipating said first charge is a diode effectively across said piezoelectric device and adapted to be forward biased by said first charge and reverse biased by said second charge.

13. The invention as defined in claim 9 wherein said means for dissipating said second charge is a photoconductive element across said piezoelectric device.

* * * * *